United States Patent [19]
Carlin et al.

[11] 3,891,741
[45] June 24, 1975

[54] RECOVERY OF FISSION PRODUCTS FROM ACIDIC WASTE SOLUTIONS THEREOF

[75] Inventors: William W. Carlin, Portland; William B. Darlington; Donald W. Dubois, both of Corpus Christi, all of Tex.

[73] Assignee: PPG Industries, Inc., Pittsburgh, Pa.

[22] Filed: Nov. 24, 1972

[21] Appl. No.: 309,377

[52] U.S. Cl. ............... 423/2; 23/300; 75/121; 203/95; 204/109; 252/301.1 R; 423/49
[51] Int. Cl. ............... C01g 55/00; C01g 57/00
[58] Field of Search ............ 252/301.1 R, 301.1 W; 423/2, 22, 49, 249; 204/105, 109

[56] References Cited
UNITED STATES PATENTS

| | | | |
|---|---|---|---|
| 2,895,889 | 7/1959 | Schumpelt | 204/47 |
| 3,309,292 | 3/1967 | Andrews | 204/39 |
| 3,374,157 | 3/1968 | Box | 204/45 R |
| 3,672,875 | 6/1972 | MacCragh | 252/301.1 R X |
| 3,708,508 | 1/1973 | Schultz | 423/22 X |

OTHER PUBLICATIONS

Lingane, Electroanlytical Chemistry, 2d Ed. 1958, Interscience Publishers, Inc., pp. 416–420, [QD 553/L5/C.2]
Korkisch, Modern Methods for the Separation of Raier Metals Ions, 1969, Pergamon Press, pp. 512–513, 520, [QD 63/S4K6].
Bray, Non–Ferrous Production Metallurgy, 2d Ed. 1947, John Wiley & Sons, Inc. pp. 416–417, [TN/665/B75n].
Bailar et al. Comprehensive Inorganic Chemistry, Pergamon Press, 1973, pp. 1170–1173, [QD151.2/C6].

*Primary Examiner*—Leland A. Sebastian
*Attorney, Agent, or Firm*—Irwin M. Stein

[57] ABSTRACT

Fission products, e.g., palladium, ruthenium and technetium, are removed from aqueous, acidic waste solutions thereof. The acidic waste solution is electrolyzed in an electrolytic cell under controlled cathodic potential conditions and technetium, ruthenium, palladium and rhodium deposited on the cathode. Metal deposit is removed from the cathode and dissolved in acid. Acid insoluble rhodium metal is recovered, dissolved by alkali metal bisulfate fusion and purified by electrolysis. In one embodiment, the solution formed by acid dissolution of the cathode metal deposit is treated with a strong oxidizing agent and distilled to separate technetium and ruthenium (as a distillate) from palladium. Technetium is separated from ruthenium by organic solvent extraction and then recovered, e.g., as an ammonium salt. Ruthenium is disposed of as waste by-product. Palladium is recovered by electrolysis of an acid solution thereof under controlled cathodic potential conditions. Further embodiments wherein alternate metal recovery sequences are used are described.

23 Claims, 3 Drawing Figures

RECOVERY OF FISSION PRODUCTS FROM ACIDIC WASTE SOLUTIONS THEREOF

DESCRIPTION OF THE INVENTION

The present invention relates to the treatment of aqueous solutions containing fission products, e.g., palladium, rhodium, technetium and ruthenium, most notably, aqueous, acidic waste solutions containing fission products obtained in processing neutron-irradiated nuclear fuel elements. In the conventional operation of uranium-fuel nuclear reactors, it is necessary to process the reactor fuel elements periodically to decontaminate and purify them in order to sustain continued operation. In the fission reaction, an atom of fissionable uranium isotope, upon absorbing a neutron, splits, thereby forming at least two smaller atoms and emitting a plurality of neutrons. These neutrons pass through the fuel element where they can be absorbed by another atom of fissionable uranium isotope thereby inducing its fission and propagating the chain reaction. The smaller atoms resulting from the splitting action, together with their radioactive decay products, are termed "fission products". These fission products comprise isotopes having atomic numbers ranging predominantly from 30 to 63 and largely remain intimately dispersed and entrapped within the fuel element. Among such fission products are species that are highly neutron-absorptive and thus deleteriously serve to intercept and drain away neutrons produced during fission so as to attenuate the further propagation of the chain reaction. Accordingly, a fuel element, upon attaining enough relative fission product concentration, is customarily discharged from the reactor and processed to eliminate fission product contamination and to isolate and recover the remaining bulk of the uranium.

One such recovery process is known as the Purex process, which is fully described in U.S. Pat. No. 2,990,240, issued June 27, 1961, in the names of Charles N. Ellison and Thomas C. Runion and entitled PROCESS FOR SEGREGATING URANIUM FROM PLUTONIUM AND FISSION PRODUCT CONTAMINATION. In the Purex process, fuel elements from nuclear reactors are dissolved in nitric acid. The plutonium, uranium and neptunium therein are recovered by tri-n-butyl phosphate solvent extraction leaving the majority of fission products, including palladium, rhodium and technetium, in the acidic aqueous wastes, which are termed Purex acid wastes (PAW). The process produces approximately 800 liters of liquid radioactive waste material per metric ton of uranium fuel processed. Heretofore, the Purex acid wastes have been neutralized with sodium carbonate and stored in large underground tanks designed to contain this self-boiling, highly radioactive solution. After four to five years of storage, the radioactivity of the solution diminishes to the point where the solution becomes non-boiling and the majority of fission products settle to the bottom of the tank in a layer of sludge.

The supernatant aqueous phase in the storage tank contains most of the cesium, strontium, rhodium, palladium, ruthenium and technetium in solution. Most of the highly radioactive cesium and strontium are selectively removed from the supernatant leaving, in solution, salts of rhodium, palladium, technetium, ruthenium, sodium and low levels of other fission products. This supernatant is customarily termed "aged alkaline Purex wastes" (PWS) and processes for separation and recovery of palladium, rhodium and technetium from such aqueous alkaline waste solutions have been proposed. See, for example, U.S. application for Pat. Ser. No. 309,015, filed Nov. 24, 1972, in the names of William W. Carlin and William Bruce Darlington and entitled RECOVERY OF FISSION PRODUCTS FROM WASTE SOLUTIONS THEREOF.

With the increasing number of nuclear fuel reactors being built and proposed for electric power generation, there is need for improved methods for processing radioactive liquid wastes. Announcements from the United States Atomic Energy Commission indicate that highly radioactive liquid wastes will be required to be processed for disposal within five years of their formation.

Although the aqueous waste stream produced by nuclear fuel processing contain palladium, rhodium and technetium at a parts per million concentration, the amount of the aforesaid metals present in such aqueous wastes is significant because of the large volume of the aqueous waste produced. It has been estimated that by 1980 more rhodium per year will be made by the nuclear industry than will be consumed in the United States. Technetium is not found naturally in nature, but it is produced by the aforementioned fission process and has been produced by neutron irradiation of molybdenum. See, for example, U.S. Pat. No. 3,382,152. Rhodium and palladium are both rare in nature. Thus, the potential dollar value of the aforesaid metals in such aqueous waste stream is high.

In accordance with the present process, fission products, e.g., technetium, rhodium and palladium, are recovered by treatment of an aqueous acidic waste stream produced by nuclear fuel processors. More specifically, the highly acidic aqueous waste stream (PAW), which generally has an acid concentration of about 8 molar, is filtered to recover undissolved rhodium and the filtrate treated with alkaline reagent until its acid concentration is reduced to about one molar or less, preferably about 0.25 molar. Alternatively, the waste stream can be partially neutralized first and then filtered to recover the rhodium metal. The partially neutralized liquid (filtrate) is electrolyzed in a first electrolytic cell under controlled cathodic potential conditions and at a potential at which technetium is deposited upon the cathode. At such a potential, palladium and rhodium, as well as ruthenium, will also be deposited on the cathode. Following electrolysis, the electrolytic cell liquor, depleted of the aforementioned metals, is returned to the nuclear fuel processor.

The metals deposited on the cathode are removed, either mechanically or chemically, e.g., by dissolution with acid. Rhodium, which is substantially insoluble in acid, is removed as a solid from the resulting acid solution by filtration and purified. Purification can be accomplished by dissolving the rhodium by alkali metal, e.g., sodium or potassium, bisulfate fusion techniques and electrolysis of an acidic, aqueous solution prepared from the melt.

In one embodiment of the present process (FIG. 1), the acid solution of metals removed from the cathode of the first electrolytic cell is treated with a strong oxidizing agent, such as perchloric acid, and distilled to thereby separate ruthenium and technetium as volatile oxides from the palladium. The remaining aqueous, acidic solution containing palladium is electrolyzed under controlled cathode potential conditions to recover palladium as a deposit on the cathode. This deposit can be removed from the cathode and consolidated.

Figure 1:
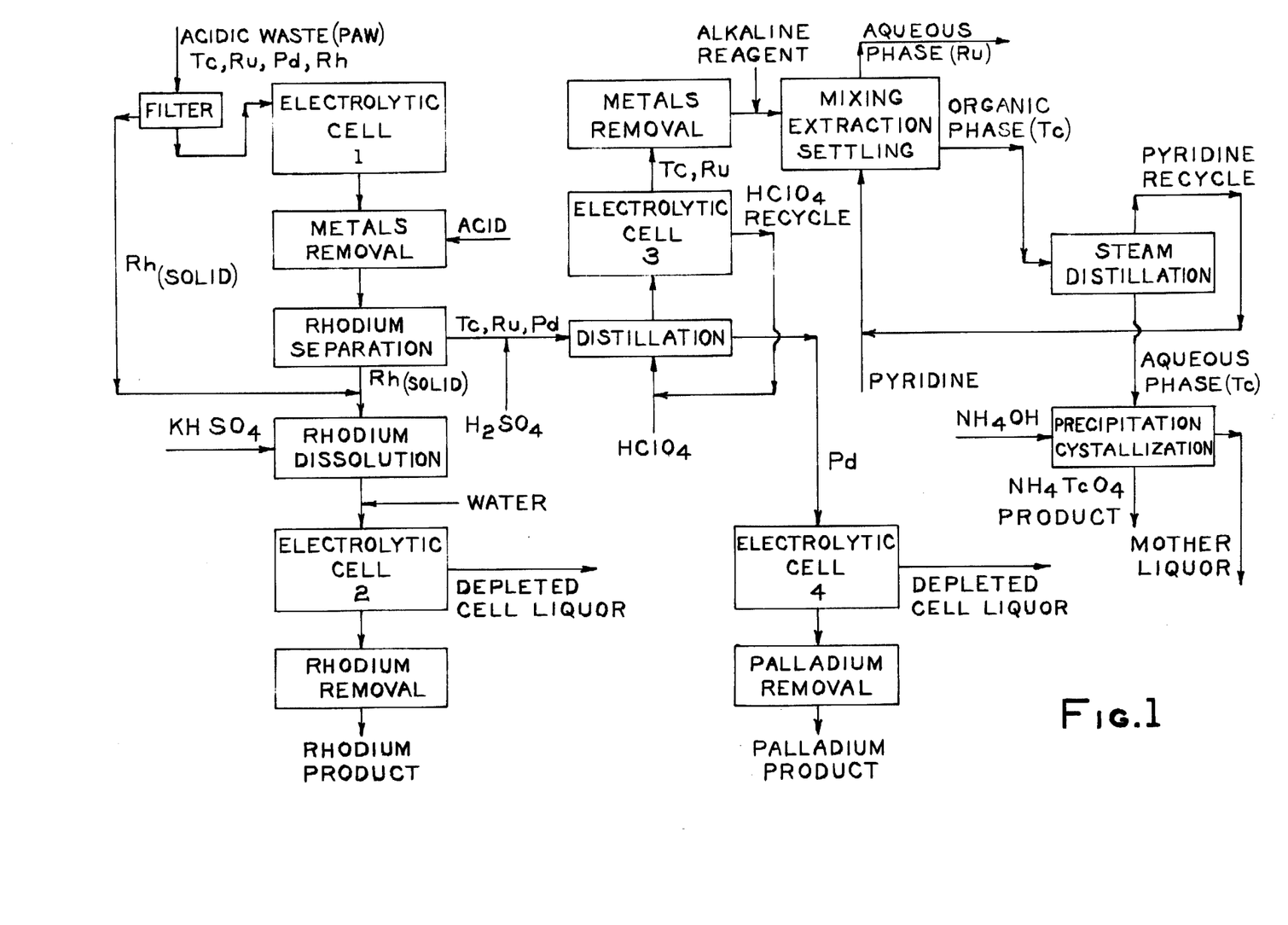
FIG. 1 is an abbreviated flow diagram of one embodiment of the recovery process of the present invention wherein rhodium, palladium and technetium are recovered.

The distillate from the aforementioned distillation, which contains technetium and ruthenium, is also electrolyzed under controlled cathodic conditions to deposit technetium and ruthenium on the cathode and to recover the strong oxidizing agent, e.g., perchloric acid, for reuse. Following removal of the technetium and ruthenium from the cathode, an alkaline solution of the metals is subjected to organic solvent extraction techniques to separate technetium from ruthenium. Ruthenium is returned to the nuclear fuel processor and technetium separated from the organic solvent by steam distillation and recovered as elemental technetium or as a metal salt product.

In a further embodiment (FIG. 2), the acid solution of metals removed from the cathode of the first electrolytic cell is made alkaline and treated with organic solvent to extract the technetium. The ruthenium and palladium remaining is returned to the nuclear fuel processor while the extracted technetium and any extracted palladium are treated to separate the two metals. For example, in a scheme not illustrated, the aqueous, acidic stream of the technetium and palladium can be sequentially electrolyzed under controlled cathode potential conditions to first recover palladium and then technetium. Alternatively, the acidic, aqueous stream of technetium and palladium can be electrolyzed to selectively recover only palladium and the depleted cell liquor treated with ammonia or ammonium hydroxide to recover technetium as the metal salt, ammonium pertechnetate.

In still a further embodiment (FIG. 3), the acid solution of metals removed from the cathode of the first electrolytic cell is electrolyzed under controlled cathodic potential conditions and at a potential at which palladium is deposited on the cathode. At such potential, ruthenium will also be deposited. The palladium and ruthenium on the cathode are removed. e.g., mechanically or by acid stripping, and, if desired, returned to the nuclear fuel reprocessor. In the alternative, the palladium and ruthenium can be further processed electrolytically (by the techniques described above) to recover ruthenium and palladium sequentially. The depleted liquor from the cell, which contains technetium and some ruthenium, is processed using the organic solvent extraction and recovery techniques described above to recover technetium.

BRIEF DESCRIPTION OF THE DRAWINGS

The present process may be more fully understood by reference to the accompanying drawings wherein.

DETAILED DESCRIPTION

Acidic waste solutions produced by commercial nuclear fuel processing plants contain significant quantities of technetium, palladium and rhodium. The acidic waste solution, depending, of course, upon the particular type of processing to which the fuel element is subjected, is typically a nitric acid solution resulting from dissolution of the nuclear fuel element with concentrated nitric acid. The acidity of such nitric acid solution can vary but is reported to be about 8 molar. The technetium, rhodium, and palladium content of such waste solution will, of course, vary depending upon the process used to produce the solution as well as the particular type of nuclear fuel element processed and the period of irradiation to which the nuclear fuel element is exposed. It has been reported that a typical aqueous, acidic waste solution will contain approximately 15 grams per liter of ruthenium, 10 grams per liter of palladium, 3 grams per liter of rhodium and 5 grams per liter of technetium in an 8 molar nitric acid solution and that the total daily output of such metals will be about 8 pounds per metric ton of solid fuel processed. Such solutions are highly radioactive and contain, in addition to the aforementioned metals, the following more common isotopes: strontium $^{90}$, ruthenium $^{106}$, iodine $^{129}$, cesium $^{137}$, cerium $^{144}$, promethium $^{147}$, zirconium $^{95}$, niobium $^{95}$, yttrium $^{90}$, ruthenium $^{103}$, antimony $^{125}$, barium $^{137}$, praseodymium $^{144}$, and cobalt $^{60}$.

In accordance with the present process and with particular reference to FIG. 1, acidic nuclear fuel waste solution containing technetium, palladium, ruthenium and rhodium fission products is filtered to remove any solid rhodium metal remaining undissolved in the solution. The filtrate is electrolyzed in an electrolytic cell under controlled cathodic conditions to deposit technetium, ruthenium, palladium, and rhodium on the surface of the cathode. The solid rhodium metal collected on the filter is sufficiently pure to use commercially, e.g., as a nitric acid catalyst, which comprises a minor amount of rhodium and a major amount of platinum. The rhodium may be contaminated with ruthenium but such contamination will not interfer with the aforementioned use.

As previously discussed, commercial nuclear fuel waste solutions are typically highly acidic and have an acid concentration, usually nitric acid, of about 8 molar. Electrolysis of such a highly acidic solution would result in the evolution of large quantities of hydrogen because the hydrogen discharge potential of highly acidic solutions is low. Further, technetium that would be deposited on the electrode (cathode) would be immediately redissolved because of the highly acidic nature of the electrolyte. While palladium and rhodium can be plated out at higher acid concentrations, e.g., 4 molar, technetium requires a significantly lower acid concentration. Therefore, if the waste solution is above about 1 molar in acid concentration, it is treated first with alkaline reagent to reduce its acidity to 1 molar or less so that it can be electrolyzed without the aforementioned difficulties. While the acid concentration of the waste solution should be reduced to no greater than about 1 molar, e.g., less than 0.25 molar, to prevent significant hydrogen evolution and redissolution of technetium metal deposits, the solution should still remain on the acid side of neutral for the aforementioned electrolysis. Acid concentrations of from 0.25 molar to 1 molar are suitable. Preferably, acid concentrations of from 0.25 molar to 0.5 molar are used.

Any conventional alkaline reagent that does not interfere with the electrolysis of the acidic waste solution can be used to reduce its acidity to the aforementioned levels. Typically, there can be mentioned sodium hydroxide, sodium carbonate, sodium bicarbonate and corresponding compounds of the other alkali metals e.g., lithium and potassium, and the oxides, hydroxides and carbonates of calcium and magnesium.

Figure 2:
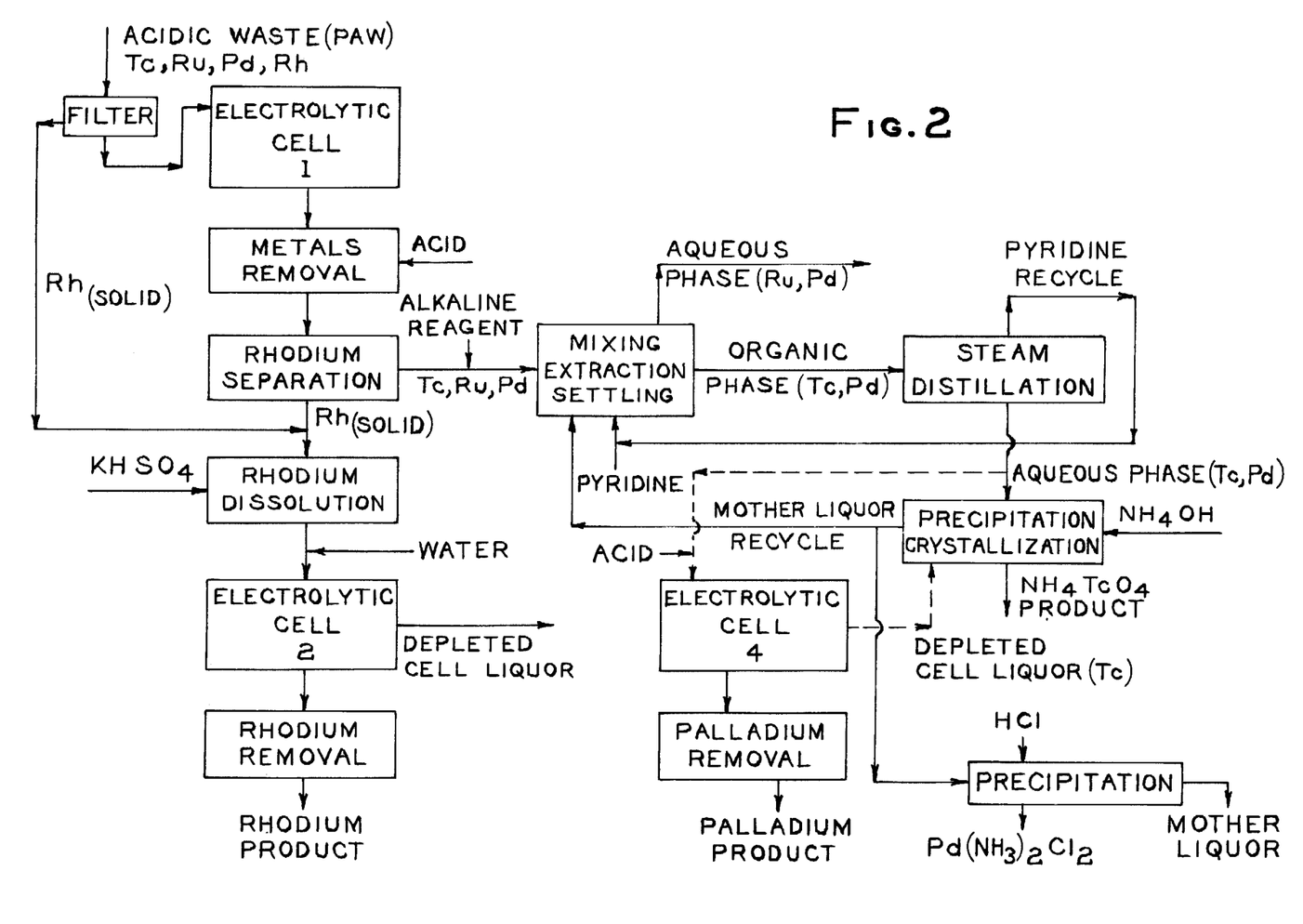
FIG. 2 is an abbreviated flow diagram of a further embodiment of the recovery process of the present invention wherein rhodium and technetium and optionally palladium are recovered.
Figure 3:
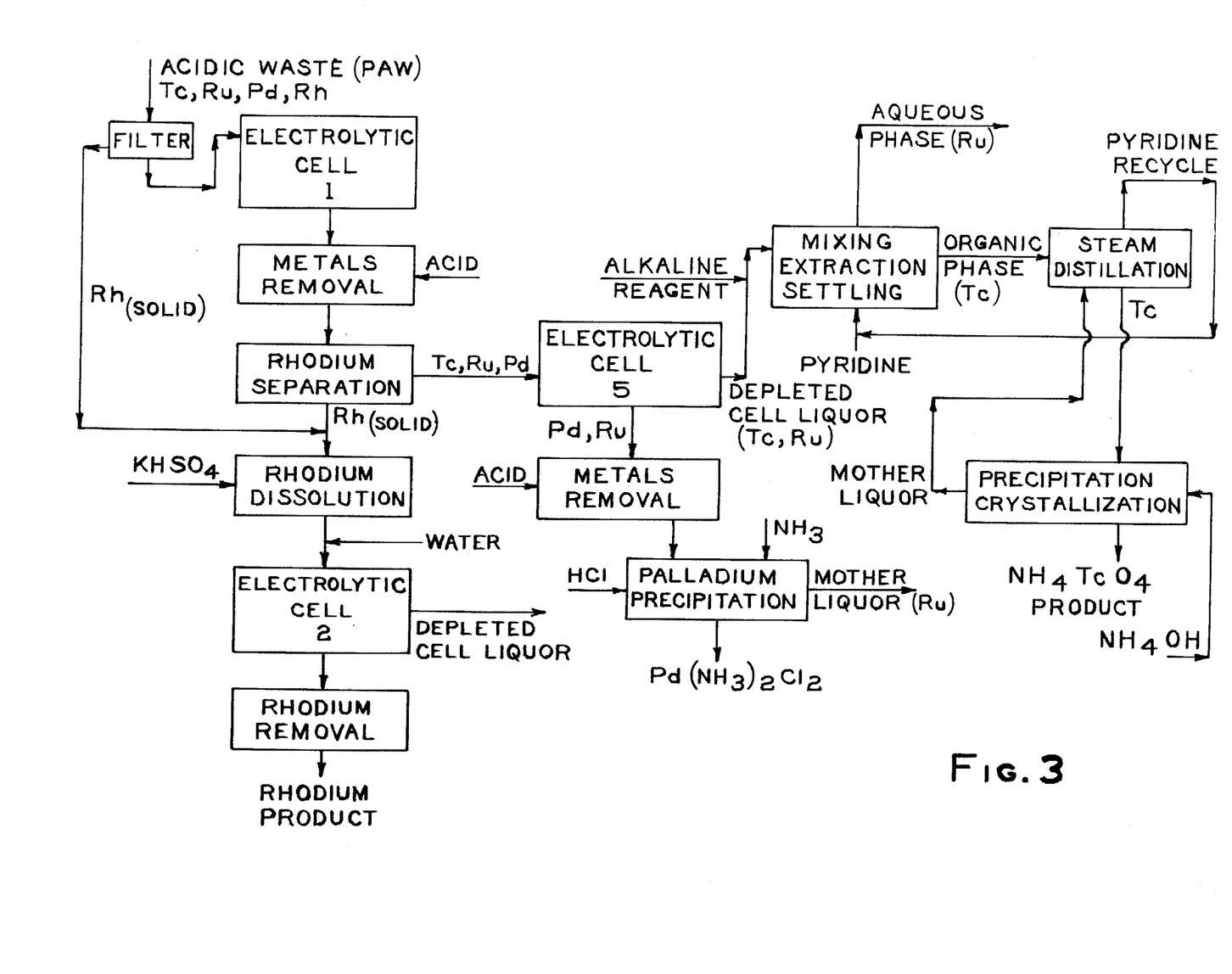
FIG. 3 is an abbreviated flow diagram of a still further embodiment of the recovery process of the present invention wherein rhodium and technetium and optionally palladium are recovered.

The following disclosure concerning electrolytic cell 1 are applicable also to the construction and operation of each of the other electrolytic cells, i.e. cells 2, 3, 4 and 5 described in connection with the present process and as depicted in FIGS. 1–3. Electrolytic cell 1, into which acidic (1 molar or less) waste solution of fission products is introduced, can be any conventional electrolytic cell containing fixed anodes and cathodes as distinguished from electrolytic cells employing a flowing, e.g., mercury, cathode or anode. Naturally, exposed portions of the cell housing and accessory apparatus are constructed out of materials that are resistant or inert to the acidic electrolyte as well as gases, if any, that are discharged at the anode and cathode. Examples of materials of construction for the cell housing include: polyvinyl chloride, polyvinylidene chloride, glass, polytetrafluoroethylene, polyvinylidene fluoride and titanium. Typically, the cell housing contains stand pipes on the anode and cathode sides of the cell to remove any oxygen and hydrogen formed thereat respectively. Such gases are passed usually through absolute filters before being vented to the atmosphere. Naturally, the cell housing is equipped with feed inlet and discharge ports. Preferably, the discharge port is located opposite the inlet port. While the electrolysis is preferably conducted at ambient or room temperatures, the cell can be equipped with a thermoregulator and heater to regulate the temperature of the electrolyte.

While only one cell is depicted in FIG. 1, more than one can be used in any of the electrolysis steps depicted. The number of cells used to recover fission product metal values by electrolytic deposition is not critical. Thus, one cell or a plurality of cells in series or disposed in a single unitary housing or box operating at the same potential can be used to remove fission product metal values from the acidic waste solution. Alternatively, a plurality of cells in series operating at different potentials can be used to remove one or more but not all of the fission product metal values from the waste solution.

The size, configuration and number of cathodes in the electrolytic cells depicted in the drawings are a function of their design and are not critical to the present invention. The cathodes should be designed in a manner so that sufficient cathode surface area is provided in the cell to plate out substantially all of the metals desired from the solution electrolyzed.

The surface area of the cathode in the electrolytic cells will depend upon the volume of electrolyte processed and on the percentage of metal recovery desired in a given period of time. Thus, for a given period of electrolysis, e.g., 24 hours, a certain percentage of metal in the electrolyte will be deposited upon a cathode of a given surface area. Generally, it is desirable that the thickness of the metal deposited on the cathode be relatively thin in order to permit removal of the metal relatively easily and to avoid dendritic growth. Typically, sufficient catode surface area should be provided to accommodate a metal deposit of from 0.1 to 5 mils thick at 90 percent, preferably at least 95 percent, recovery and more desirably at least 99 percent recovery. The surface area of the anodes should match or exceed that of the cathodes in order to achieve uniform deposition of the metal on the cathode.

Thus, in operating the electrolytic cells described herein at a selected cathode potential, a cathode surface area sufficient to allow deposition of at least 90 percent, preferably at least 95 percent, and more desirably at least 99 percent, of the metal(s) in the electrolyte subjected to electrolysis in a given period of time is used. Generally, the current density will range from about 0.1 to about 100 amperes per square foot of cathode surface. Since the electrolysis is performed at a constant cathode potential, the voltage of the cell will be an independent variable and the current will be a dependent variable in the current-voltage relationship. The resistance of the cell is fixed initially by the cell design and electrolyte and increases with time during electrolysis. As a consequence, the current decreases with time. Such decrease is an indication of the depletion of the metal concentration in the electrolyte.

The operating variables of the electrolytic cells which affect deposition time, i.e., the rate of deposition, are the stirring or circulation of the electrolyte and the ratio of cathode surface area to electrolyte volume. A more rapid deposition rate is obtained by vigorous circulation with a given ratio of cathode surface area to electrolyte volume than with no circulation. The cathode surface area required is not a function of the concentration of the recoverable metals in the electrolyte but is a function of the electrolyte volume. The particular cell volume required depends, in the main, on the quantity of electrolyte to be processed. Calculations, based on laboratory experience, indicate that each gallon of electrolyte requires about 0.5 square feet of cathode surface area if a depletion of 99 percent in 20 hours is acceptable. To obtain a 99.9 percent depletion in 20 hours, a minimum cathode area of about 0.75 square feet per gallon of electrolyte will be necessary. Naturally, the longer the depletion time which is acceptable, the less cathode surface area required. In another sense, the lower the desired percentage depletion for a given period of time, the less cathode surface area required.

In order to achieve good stirring or circulation of the electrolyte in the cell, the cell is typically operated in conjunction with an adjoining circulation tank between which the electrolyte is cycled. However, such cycling of electrolyte is not neccessary, i.e., the volume of the cell can be sufficient to electrolyze batchwise the amount of electrolyte generated by the present recovery process in a given period of time.

The anodes of the electrolytic cells can be fabricated from any conventional electrode material resistant to attack by the electrolyte present in the cell and substantially inert to gaseous oxygen which may be evolved at the anode. Suitable anode materials include noble metals, such as platinum, rhodium, iridium and platinum-iridium alloys, carbon (graphite), and valve metals, such as titanium, tantalum, zirconium, hafnium and titanium-clad copper having a coating of rhodium, platinum, iridium, platinum-iridium alloys or ruthenium oxide. By "valve metal" is meant a material which does not pass current when anodic but which does pass current when cathodic. Thus, any conventional electrode material which is compatible with the electrolyte in the electrolytic cell and which resists being solubilized during electrolysis can be used as the anode in the cell.

The cathodes of the electrolytic cells can be fabricated from any conventional electrode material that is resistant to attack by the electrolyte in the cell, substantially inert to gaseous hydrogen which may be evolved at the cathode and which has a high hydrogen overvoltage. By "overvoltage" is meant the excess voltage above the theoretical voltage that is required to reduce the element, e.g., hydrogen, to its elemental state in the same electrolyte under the conditions stated. Suitable cathode materials include titanium, tantalum, zirconium, hafnium, titanium-clad copper or other valve metals and carbon (graphite). Titanium is especially useful as the cathode material.

Electrolysis is conducted by connecting the cathode(s) and anode(s) (s) of the electrolytic cell to a source of direct current and applying an electrolyzing current across the electrode at a substantially constant cathode potential. The electric power fed to the cell is in amounts sufficient to cause electrolysis of the electrolyte and cause deposition of the desired metal(s) on the cathode surface.

In accordance with the present process, fission product metal values are recovered in electrolytic cell 1 by electrolyzing acidic, aqueous waste solution containing such metals under a controlled cathode potential of at least about $-0.1$ volts with reference to a standard silver/silver chloride reference electrode. Preferably, and for a significant rate of technetium deposition, a potential of from $-0.37$ to about $-0.40$ volts is used, basis the same reference electrode. At the aforementioned potential, palladium, rhodium, technetium and ruthenium will be deposited on the cathode surface. A voltage of $-0.4$ volts, based on the recited reference electrode, will achieve co-deposition of metals in the solution which deposit at a potential more positive than $-0.4$ volts. Metals that are deposited at a more negative potential than $-0.4$ volts remain in solution. Some metal values will precipitate out of solution as oxides at a potential of $-0.4$ volts; however, little, if any, of the isotopes (except ruthenium) mentioned heretofore will plate out onto the cathode. Alternatively, one or more but not all of the fission product metal values in the aqueous waste solution can be separated therefrom by conducting the electrolysis at a potential at which the desired metal(s) values will be deposited on the cathode and at a potential that is positive with respect to the undesired metal(s) values.

Controlled cathodic potential is achieved by utilizing a standard reference electrode in a salt bridge system. In such a system, the reference electrode is electrically connected to a potentiometer-controller, which operates to provide a signal to a rectifier controlling the power to the electrolytic cell. The reference electrode is also connected electrically to a sensing tip which is positioned close to the surface of the cell cathode. The reference electrode is usually positioned in a manner such that the sensing tip is from 0.5 to two millimeters from the working cathode surface. In this manner, a changing cathode potential occurring on the cathode surface is sensed by the tip of the reference electrode. That change produces a signal which is transmitted from the reference electrode to the controller-potentiometer which, in turn, signals the rectifier feeding power to the electrolytic cell, thereby causing an appropriate voltage adjustment, i.e., either an increase or a decrease. This control system can regulate the cathode potential to within $\pm 0.01$ volts. Because of the generally high conductivity of the electrolyte, the use of low current densities, ambient temperatures and the reporting of potentials to 0.01 volts, correction for the voltage drop between the reference electrode tip and the working electrode surface is not generally necessary. The above-described equipment for controlling cathode potential is aptly described in U.S. Pat. No. 3,562,123. Such description is incorporated herein by reference.

While the aforementioned cathode potentials are based upon a standard silver/silver chloride reference electrode, other reference electrodes, such as a standard hydrogen electrode, can be used. If another standard reference electrode is used, the numerically designated cathode potentials recited herein would, of course, be different.

Cell liquor from electrolytic cell 1 that is depleted of fission product metal values is still highly radioactive and is, therefore, returned to the fuel processor for concentration and disposal. As shown in FIG. 1, the metal deposit on the cathode in electrolytic cell 1 is removed by any convenient means. Mechanical removal by, for example, stripping the deposited metals with a knife-type edge, or chemical removal by dissolving the metal deposit in strong acid compatible with the rest of the process are typically used. In the latter, the electrolytic cell is typically flooded with acid of sufficient strength to dissolve the metal(s) deposit, e.g., nitric acid or sulfuric acid, of greater than 1 molar, e.g., 8 to 15 molar, or, the cathode is removed physically from the cell and immersed in a bath of the aforementioned acid.

Rhodium is substantially insoluble in most acids including aqua regia. Thus, the use of, for example, mineral acids such nitric or sulfuric acids to chemically strip the fission product metal(s) deposit from the cathode of electrolytic cell 1 typically results in a solution of metals other than rhodium which contains solid particles of rhodium. If the metal deposit is removed from the cathode of electrolytic cell 1 by mechanical means, the deposit is dissolved subsequently in acid, e.g., the aforementioned acids to produce the aforementioned acid solution.

Solid rhodium metal particles are separated from the resulting acid solution of electroplated metals by any suitable liquid-solid separation technique, such as filtration. If desired, the rhodium separated initially by filtering the acidic waste solution of fission product values (PAW) can be combined with the rhodium particles obtained by, for example, filtering the acid solution of metals electroplated in electrolytic cell 1. The solid rhodium metal thereby obtained is, washed with water and dissolved by fusion with alkali metal, e.g., potassium or sodium, bisulfate. Dissolution of rhodium by alkali metal bisulfate fusion is discussed on pages 846–847 of the Kirk-Othmer Encyclopedia of Chemical Technology, Second Edition, Volume 15, (1968). That discussion is incorporated herein by reference. Briefly, the aforementioned technique comprises mixing the rhodium metal with, for example, potassium bisulfate and heating the mixture to above the melting point of the bisulfate to dissolve the rhodium metal. After cooling, the potassium bisulfate melt containing rhodium is mixed with water to form an aqueous solution of the melt.

The amount of alkali metal bisulfate used and the temperature to which the rhodium metal-bisulfate mixture is heated is not critical. Thus, only that amount of bisulfate required to dissolve the rhodium metal obtained is required. Generally, temperatures of from the melting point of the bisulfate, e.g., 214°C. for potassium bisulfate, to about 500°C. are sufficient to dissolve the rhodium. Similarly, only that amount of water which is sufficient to dissolve completely the alkali metal bisulfate containing rhodium, most likely as the rhodium sulfate salt, is required. Typically, the resulting bisulfate solution contains from 100 to 500 grams per liter of alkali metal bisulfate, more commonly about 250 grams per liter. The bisulfate solution is acidic and can be used as a rhodium plating bath, i.e., as an electrolyte.

The bisulfate solution is introduced into electrolytic cell 2, which is similar to electrolytic cell 1, and the solution electrolyzed therein under controlled cathodic potential conditions to thereby deposit rhodium on the surface of the cathode. The cathodes, anodes, operation and construction of electrolytic cell 2 can be the same as that discussed with respect to electrolytic cell 1.

In electrolyzing an acidic, alkali metal bisulfate rhodium-containing solution in electrolytic cell 2, the cathode and anode of the cell are connected to a source of direct current and an electrolyzing current cathode applied to the solution therein at a substantially constant Electric potential to thereby deposit metallic rhodium on the cathode. Electric power fed to the cell is in amounts sufficient to cause electrolysis of the electrolyte solution and cause deposition of rhodium on the cathode.

The potential at which rhodium is controllably deposited upon the cathode can vary from about −0.05 to about −0.5 volts with reference to a standard silver/silver chloride reference electrode. Preferably, the cathode potential is controlled at from about −0.2 to about −0.3 volts with reference to a standard silver/silver chloride reference electrode. The upper limit of cathode potential, i.e., more negative than −0.5 volts, is not critical; however, a more negative voltage does not increase the rate of deposition and, since hydrogen is liberated starting at about −0.3 volts, it is preferred to maintain the cathodic potential at between −0.2 and −0.3 volts to thereby minimize hydrogen evolution. Completion of rhodium deposition can be ascertained by monitoring the cell current. After a period of slow current decay, the current plateaus at a very low level. When the cell current becomes negligible, electrolysis can be terminated.

The rhodium metal deposited on the surface of the cathode of electrolytic cell 2 is removed therefrom, either mechanically or by undermining the deposit with acid. For example, a dilute hydrofluoric acid solution or a nitric acid solution can be used for this purpose. Methods for removing rhodium deposits from the cathode surface are described in U.S. application for U.S. Pat. Ser. No. 309,046 filed Nov. 24, 1972, now abandoned in the name of William W. Carlin, entitled ELECTROLYTIC RECOVERY OF RHODIUM and U.S. application for U.S. Pat. Ser. No. 309,047 filed Nov. 24, 1972 in the name of Donald W. DuBois entitled RECOVERY OF ELECTROLYTIC DEPOSITS OF RHODIUM.

In the former application rhodium is deposited on a cathode comprising an electroconductive metallic substrate having a superposed electronconductive coating of a metal other than the substrate metal that is soluble in mineral acid. When the coating is dissolved, the rhodium deposit flakes off the cathode. In the latter application, dilute hydrofluoric acid is used to strip the rhodium deposit from the cathode.

The solid rhodium metal removed from the cathode is washed with water and consolidated by melting. The spent electrolyte depleted of its rhodium content is sent to the fuel processor for disposal. Since ruthenium does not dissolve in the alkali metal bisulfate, any ruthenium impurity contained in the rhodium particles is segregated and returned to the fuel processor in the spent liquor by the aforementioned techniques. In this manner, refined rhodium is obtained.

As shown in FIG. 1, the filtrate obtained from separating solid rhodium from the acid solution of electroplated fission product metals recovered in electrolytic cell 1 is treated further to recover and separate the technetium and palladium contained therein. Normally, such solution will also contain ruthenium. In accordance with the process flow diagram of FIG. 1, the aforementioned acid solution (filtrate) is contacted with a strong oxidizing agent, such as perchloric acid, and the resulting solution distilled to remove technetium and ruthenium as their volatile oxides together with the oxidizing agent, e.g., perchloric acid, from the solution.

In accordance with the above-described embodiment, perchloric acid, usually 70 percent perchloric acid, is added in a quantity sufficient to oxidize substantially all the technetium and ruthenium present in the acid solution, which is advantageously a sulfuric acid solution because of sulfuric acid's high boiling point, to valence states that form volatile oxides. Sufficient heat is applied to the solution to distill perchloric acid and the volatile oxides of ruthenium and technetium while retaining palladium in the remaining sulfuric acid solution (bottoms). Heating is continued until sulfuric acid fumes are formed. This will normally occur at a pot temperature of from about 330°C. to 345°C. At this temperature, substantially all the perchloric acid has been removed from the sulfuric acid solution.

The perchloric acid distillate containing technetium and ruthenium is condensed and the condensate electrolyzed in electrolytic cell 3 at a controlled cathode potential of between −0.3 and about −0.5 volts with reference to a standard silver/silver chloride reference electrode to deposit technetium and ruthenium on the cathode surface. The cathodes, anodes, operation and construction of electrolytic cell 3 are similar to that described with respect to electrolytic cells 1 and 2. The metal depleted perchloric acid solution remaining in cell 3 is recycled for use in the manner previously described.

The technetium and ruthenium plated upon the cathode of electrolytic cell 3 can be mechanically or chemically stripped. In the latter technique, the cell is flooded with a strong mineral acid, such as nitric, hydrochloric or sulfuric acid, having a concentration sufficient to dissolve the metallic deposit from the cathode. The stripping acid will usually have a concentration of at least 1 molar preferably from 8 to 15 molar.

In the former technique, the metallic deposit is stripped from the cathode with a knife-like blade. The flakes recovered can then be dissolved in the aforementioned acids. Concentrated nitric acid is preferred.

The resulting acidic solution, e.g., a nitric acid solution, containing ruthenium and technetium is made alkaline i.e., the pH of the acid solution is adjusted (raised) to a pH greater than 7, with any suitable alkaline reagent, such as sodium hydroxide or sodium carbonate and technetium extracted therefrom with an organic solvent by liquid/liquid extraction techniques.

Any conventional alkaline reagent that does not interfere with the subsequent organic extraction can be used to make the solution alkaline. In addition to the reagents heretofore mentioned there can be used sodium bicarbonate and the corresponding compounds (hydroxides, carbonates, and bicarbonates) of other alkali metals, e.g., lithium and potassium and the oxides, hydroxides and carbonates of calcium and magnesium. The alkaline reagent concentration is not critical. With respect to sodium hydroxide or sodium carbonate, a 2 to 4 normal solution is useful and adequate.

The organic solvent chosen must have a high affinity or selectivity for technetium and show a favorably high distribution coefficient (organic/aqueous) for technetium relative to the alkaline aqueous medium from which the technetium is extracted. Pyridine and methyl- and ethyl-substituted pyridine derivatives, such as the 2,3-, 2,4-, 2,5- 2,6-, 3,4- and 3,5-dimethyl pyridines, have been shown to be useful for the extraction of technetium from aqueous solutions thereof. Methyl ethyl substituted pyridines and mixtures of pyridine derivatives can also be used. 2,4- dimethyl pyridine is preferred. The extraction of technetium with pyridine and methyl-substituted derivatives thereof is described adequately in Analytic Chemistry, Volume 33, pages 751–754 (1961). That description is therefore, incorporated herein, in toto, by reference.

Separation of technetium from ruthenium by extraction of the technetium with an organic solvent, such as 2,4-dimethyl pyridine, having an affinity for technetium is accomplished by conventional techniques and is not critical. Thus, the solvent is mixed with the alkaline aqueous medium containing technetium in amounts sufficient to extract the technetium available for extraction and for a length of time sufficient to obtain intimate contact between the aqueous and organic phases to accomplish the extraction. Commonly, volumetric ratios of solvent to aqueous medium of from 10:1 to 1:10, e.g., 1:1 to 1:3 can be used. Mixing times will vary, but will range from about 1 to 60, e.g., 5–30 minutes.

Technetium is extracted into the organic phase while the ruthenium remains in the aqueous phase. The two phases are allowed to separate and the aqueous phase, which contains radioactive ruthenium, is returned to the fuel processor. The organic phase can be washed further with an alkaline reagent, e.g., sodium or potassium hydroxide, to further purify the organic phase of impurities carried along with the solvent during the extraction step. The concentration and amount of alkaline reagent are not critical. Commonly, 2 to 6 molar solutions in volumes ranging from about 10 to 200 percent of the organic phase volume are used.

The organic technetium-containing phase is steam distilled to remove the organic solvent and return the technetium to the aqueous phase. The steam distilled organic (pyridine) solvent is relatively pure and can be recycled for use again in the extraction step. Some of the organic solvent remains associated with the technetium in the aqueous phase since the separation is not sharp and, if desired, this organic residue can be removed by extraction with an organic solvent, such as chloroform, benzene, hexane or kerosene.

In the embodiment shown in FIG. 1, technetium is isolated an an ammonium salt by adding an ammoniacal reagent, such as ammonia or ammonium hydroxide, to the aqueous phase resulting from the steam distillation step. The resulting salt, ammonium pertechnetate, is crystallized from the alkaline solution. Crystallization of ammonium pertechnetate is advantageously performed at temperatures of from −5°C., preferably from about −5°C. to about 5°C. Crystallization can be repeated several times to improve the purity of the ammonium pertechnetate, which is an article of commerce. Ammonium pertechnetate of greater than 99 percent purity can be recovered in this manner. The mother liquor from the crystallization step can be recycled to the steam distillation step.

In another embodiment, the aqueous technetium containing phase from the steam distillation step can be reacidified with, for example, perchloric acid or sulfuric acid, and deposited on the cathode of an electrolytic cell under the controlled cathodic potential conditions discussed above. A potential of −0.3 to −0.5, preferably −0.4, volts with reference to a standard silver/silver chloride reference electrode is used. In this manner, technetium metal instead of the salt, ammonium pertechnetate, is recovered as the final product.

The acidic solution (bottoms) remaining from the distillation that removed technetium and ruthenium as volatile oxides contains the palladium removed from the acidic aqueous waste solution (PAW) in electrolytic cell 1. This acidic solution, which is typically a sulfuric acid solution, is electrolyzed in electrolytic cell 4 under controlled cathodic potential conditions. The cathodes, anodes, operation and construction of electrolytic cell 4 are similar to that described with respect to electrolytic cells 1, 2 and 3. Palladium can be plated effectively at a cathode potential of +0.1 to −0.05 volts, preferably at +0.05 volts, with reference to a standard silver/silver chloride electrode. In the controlled cathodic potential electrolysis of palladium, no hydrogen is usually evolved since the cathode potential is sufficiently positive with respect to the potential at which hydrogen evolution commences.

The palladium deposited upon the cathode of electrolytic cell 4 can be recovered by any one of several methods. For example, the cathode can be removed from the cell, water washed and the palladium mechanically stripped. The flakes of palladium thereby obtained can be consolidated by melting in a furnace for recovery of solid elemental palladium, or the flakes can be ground and recovered as a powder. Alternatively, the palladium flakes can be dissolved in nitric or sulfuric acid for replating in order to further refine the palladium metal product.

In a further embodiment of the above-described recovery process, reference is made specifically to the abbreviated flow diagram of FIG. 2. The filtrate obtained from separating solid rhodium from the acid solution of electroplated fission products recovered in electrolytic cell 1 and which contains technetium, ruthenium and palladium metal values is treated with alkaline reagent, e.g., 50 percent sodium hydroxide, in sufficient quantities to make the solution alkaline. As indicated previously, suitable alkaline reagents include sodium hydroxide, sodium carbonate, sodium bicarbonate, corresponding compounds of other alkali metal compounds, e.g., lithium and potassium and the oxides, hydroxides and carbonates of calcium and magnesium. The resulting alkaline solution is treated with an organic solvent to selectively extract technetium in the manner heretofore described. Tests with 2,4-dimethylpyridine have shown that a portion of the palladium present in the filtrate is also extracted into the organic phase. The aqueous and organic phases are permitted to separate, e.g., by settling, and the aqueous phase, which contains ruthenium and the remaining palladium, is returned to the fuel processor.

The organic phase, which contains technetium and palladium, can be washed with an alkaline reagent, e.g., sodium hydroxide, to further remove contaminants from the organic phase, as described hereinabove, and, upon separation of the wash solution, is steam distilled to recover the organic solvent in the manner previously described. The aqueous phase resulting from the steam distillation, which contains technetium and palladium, is further treated then to recover one or both. In one embodiment, as shown by the solid lines in FIG. 2, the aqueous solution is treated, e.g., saturated, with an ammoniacal reagent, such as ammonia or ammonium hydroxide, to recover technetium as the ammonium salt. This salt, ammonium pertechnetate, is crystallized from the resulting alkaline solution in the manner described heretofore. The mother liquor from the crystallization step, which contains the palladium, can be handled in several ways. As shown, the mother liquor is recycled to the extraction step. There a portion of the palladium in the mother liquor will be removed into the aqueous phase returned to the fuel processor. Eventually, the amount of palladium in the process loop will reach a fairly steady concentration, which is determined by the distribution coefficient of the organic solvent used.

When steady-state conditions are approached or attained, a bleed stream from the mother liquor can be treated to recover palladium. As illustrated, the mother liquor bleed stream can be treated with a stoichiometric excess of hydrochloric acid to precipitate the palladium as the salt, dichlorodiamminepalladium (II), Pd $(NH_3)_2$ $Cl_2$. See, for example, the article, "Platinum and Allied Metals" by C. Johnson and R. H. Atkinson, Trans. Inst. Chem. Eng., Volume 15, pp. 131–149, 1937. Alternatively, the palladium can be precipitated from a 5 percent hydrochloric acid solution with sodium dimethylglyoxime. See, for example, Treatise on Analytical Chemistry, Im M. Kolthoff et al Ed., Volume 8, Part II, ppg. 379–522, J. Wiley (Interscience Publishers), New York, 1963.

The palladium salt recovered from the precipitation step can then be heated at from 800° – 1000°C. to decompose the salt and leave palladium metal as a residue. In the case of the ammonium salt, ammonium chloride will be driven off; and, in the case of the dioxime salt, carbon dioxide will be driven off. The mother liquor from the palladium precipitation step is returned to the fuel processor. Naturally, the aforementioned palladium recovery steps can be applied to the mother liquor resulting from the technetium crystallization step before steady state conditions are attained, or to the entire mother liquor stream, i.e., eliminating recycle. Alternatively, palladium in the mother liquor or mother liquor bleed stream can be recovered by electrolysis (after acidification - as described hereinafter) or, the liquor can be disposed of as waste, i.e., returned to the fuel processor.

In the embodiment shown by the broken line in FIG. 2, the aqueous phase resulting from steam distilling the organic solvent (pyridine) extractant is acidified with mineral acid, e.g., concentrated sulfuric or nitric acids, to an acid concentration suitable for electrolysis, e.g., from about 0.25 to about 1 molar. This acidified solution is introduced into electrolytic cell 4 wherein the solution is electrolyzed at a constant cathode potential to selectively recover palladium. Thus, by controlling the cathode potential of electrolytic cell 4 at a potential negative with respect to the potential at which palladium is deposited, i.e., +0.1 to −0.05 volts, but positive with respect to the potential at which technetium is deposited, i.e., −0.3 to −0.5 volts (both with reference to a standard silver/silver chloride reference electrode) palladium can be selectively separated from technetium. The cathodes, anodes, operation and construction of electrolytic cell 4 can be the same as that discussed with respect to electrolytic cells 1, 2 and 3.

Following electrolysis, the cell liquor, depleted of its palladium content, is removed and, in accordance with the previous discussion, treated with an ammoniacal reagent to recover technetium as its ammonium salt. Palladium is recovered from the cathode of electrolytic cell 4 in the manner described heretofore. Alternatively, the aforementioned cell liquor can be electrolyzed at a potential at which technetium is plated (as previously described) and technetium metal recovered in this manner. Such sequential electrolysis can be accomplished by removing the palladium plated cathodes from cell 4 and replacing them with clean cathodes suitable for plating technetium or by forwarding the cell liquor to a further electrolytic cell (not shown) operating at technetium plating electrolysis conditions.

In still a further embodiment of the above-described recovery process, reference is made specifically to FIG. 3. The filtrate obtained from separating solid rhodium from the acid solution of electroplated fission products recovered in electrolytic cell 1 and which contains technetium, palladium and ruthenium values is introduced directly into electrolytic cell 5. Since the filtrate is very acidic, e.g., 5 molar in nitric acid, it is preferred to reduce the acidity for electrolysis to 0.25 to 1.0 molar, as described previously, with alkaline reagent. Such conditions permit the fission products, e.g., technetium to be plated out without redissolution by the acidic electrolyte. The partially neutralized filtrate is electrolyzed at controlled cathodic potential conditions to deposit palladium but not technetium onto the cathode, i.e., at a potential of from +0.1 to −0.05 volts, e.g., +0.05 volts. Since ruthenium begins to plate out at a potential more positive than that at which palladium is plated, the palladium recovered will be contaminated with a small amount of ruthenium.

Following electrolysis, the cell liquor, now depleted of its palladium and most of its ruthenium content, is treated with alkaline reagent to make the cell mother liquor alkaline. As described with respect to FIGS. 1 and 2, any suitable alkaline reagent, usually of 2–4 molar concentration, can be used. The technetium in the cell liquor is extracted by the selective organic solvent extraction technique described heretofore, and, if desired, the organic phase washed with alkaline reagent. Ruthenium, if any, which is not removed by the electrolysis conducted in electrolytic cell 5 remains in the aqueous phase resulting from the extraction step and returned to the fuel processor with that process stream. Technetium is recovered as ammonium pertechnetate or as the elemental metal by electrolysis by methods previously described.

The palladium and ruthenium deposited on the cathode of electrolytic cell 5 are removed either by mechanically stripping the deposit or by dissolving the deposit from the cathode with a suitable stripping acid, e.g., concentrated (8 to 15 molar) nitric or sulfuric acids. This acid solution, which can be radioactive due to the radioactivity of contaminating quantities of ruthenium, can be returned to the fuel processor. In the event, nitric acid is preferred as the stripping acid because of its use by the fuel processor.

If desired, the ruthenium can be further separated from the palladium by subjecting the ruthenium-palladium containing acid solution to sequential and selective controlled cathode potential electrolysis. In such event, palladium is removed first by controlled cathode potential electrolysis at potentials more positive than +0.1, e.g., +0.4 to +0.2, followed by dissolution of the deposit and redeposition of the resulting ruthenium depleted electrolyte at the above recited cathode potential, i.e., +0.4 to +0.2 volts. All of the aforementioned potentials are with reference to a standard silver/silver chloride reference electrode.

While the aforementioned cathode potentials are based upon a standard silver/silver chloride reference electrode, it is understood that other reference electrodes, such as a standard hydrogen electrode, can be used. If other standard reference electrodes are used, the numerically designated cathode potentials recited herein would, of course, be different.

Alternatively, and as shown in FIG. 3, the palladium and ruthenium deposited on the cathode of electrolytic cell 5 can be dissolved in concentrated hydrochloric or nitric acids or aqua regia and precipitated with ammonia (as described hereinbefore) as the salt ($Pd(NH_3)_2Cl_2$). The mother liquor from this precipitation, which contains the ruthenium, is returned to the fuel processor for disposal as a waste stream. As a further alternative, the palladium deposited can be refined, i.e., separated from the contaminating quantities of ruthenium, by dissolving the deposit and replating the palladium in the manner first described, i.e., plating at a cathode potential of +0.05 volts. That procedure can be repeated two or more times to refine the palladium product obtained.

The present process is more particularly described in the following examples which are intended as illustrative only since numerous modifications and variations therein will be apparent to one skilled in the art.

EXAMPLE I

Recovery of Fission Product Metals

A similated acidic waste solution of fission products (PAW) is prepared with 8 molar nitric acid. The waste solution contains 15 grams/liter of ruthenium, 10 grams/liter of palladium, 3 grams/liter of rhodium and 5 grams/liter of technetium. One hundred milliters of the similated acid waste solution is filtered through a 0.8 micron Millipore filter to remove any rhodium solids that are present. The filtrate is partially neutralized with 50 percent sodium hydroxide so that the resulting solution is approximately 0.2 M in nitric acid (pH 1). This solution is poured into a 150 ml. glass beaker cell equipped with a platinum coated titanium anode and a titanium cathode installed on a magnetic stirrer.

Electrolysis of the 0.2 M nitric acid solution is conducted at a controlled cathode potential of −0.40 volts (versus a silver/silver chloride reference electrode) for about 48 hours. The current density on the cathode is initially 70 milliamps/cm$^2$. At the end of electrolysis, the current density is 0.3 milliamps/cm$^2$. About 99 percent of the palladium, rhodium and technetium and about 60 percent of the ruthenium in the simulated solution is plated onto the cathode. The spent electrolyte is discarded and the cathode washed with 10 ml of deionized water. The metal deposit on the cathode is anodically stripped from the cathode with 30 ml. of 5 molar nitric acid. The palladium, ruthenium and technetium in the metal deposit are dissolved in the acid; while, the rhodium remains as small solid flakes in the resulting solution.

Separation of Rhodium

The acid solution of anodically stripped metals is filtered through an 0.8 micron Millipore filter to remove the rhodium solids. These solids are found to contain a trace amount of ruthenium contamination. 2.5 milligrams of the rhodium solids are mixed with 5 grams of potassium bisulfate and heated for 30 minutes of red heat (500°C.). On cooling, 50 ml of deionized water is added to the solid fusion product to dissolve it. The resulting aqueous solution is charged to an electrolytic beaker cell having a platinum coated titanium anode and a titanium cathode and being similarly constructed to the first mentioned beaker cell and electrolyzed at a controlled cathode potential of −0.31 volts (versus a silver/silver chloride reference electrode) for 24 hours. The maximum current density is 2 milliamps/cm$^2$. About 96% of the rhodium in the aqueous solution is deposited on the cathode. The rhodium deposit is recovered by draining the electrolyte from the cell, washing the cathode with 5 ml of deionized water and mechanically stripping the rhodium metal deposit from the cathode.

Separation of Palladium

The filtrate obtained from filtering the acid solution of anodically stripped metals is mixed with 10 ml of concentrated sulfuric acid and the mixture distilled in a 250 ml, 3-necked still pot equipped with a Friedrich condenser and a 150 ml. receiver. The still is operated at a head temperature of 120°C. until no more nitric acid is carried over into the receiver. The nitric acid distillate is put aside for reuse. The still pot is cooled and 50 ml of deionized water and 25 ml of 72% perchloric acid is added to the pot. The perchloric acid mixture in the pot is distilled until the appearance of $SO_3$ fumes, which indicates that all of the technetium and ruthenium, as well as the perchloric acid, has been distilled.

The pot residue, which contains palladium, is cooled, diluted with deionized water to a volume of 80 ml and charged to an electrolytic beaker cell having a platinum coated titanium anode and a titanium cathode. The cell is constructed similarly to that of the first mentioned beaker cell. The aqueous palladium containing solution is electrolyzed in the cell at a cathode potential of −0.04 volts (versus a silver/silver chloride reference electrode) until the current decreases to 0.002 amperes. Palladium metal is recovered from the cathode by draining the electrolyte from the cell, washing the cathode with 10 ml of deionized water and removing the palladium deposit mechanically from the cathode. Palladium recovery is 96.9 percent.

Separation of Technetium

The perchloric acid distillate (70 ml) is charged to an electrolytic beaker cell of the same type as described heretofore and the distillate electrolyzed at a cathode potential of −0.4 volts (versus a silver/silver chloride reference electrode). Electrolysis is continued for 24 hours at an initial current density of 70 milliamps/cm$^2$. The current density at the end of the electrolysis is 0.3 milliamps/cm$^2$. The perchloric acid electrolyte is drained from the cell and saved for reuse. The cathode is washed with 10 ml of deionized water and then anodically stripped into 30 ml of 1 molar nitric acid. The technetium recovery is 99 percent and the ruthenium recovery is 57 percent.

The acid solution containing technetium and ruthenium is made alkaline with solid sodium hydroxide and diluted to 50 ml. The alkaline solution is extracted with two 50 ml portions of 2,4-dimethylpyridine in a separatory funnel and 96 percent of the technetium recovered in the organic phase. The organic phase is steam distilled in a 250 ml 3-necked flask equipped with a Friedrich condenser. The organic phase distills over at 97°C. leaving an aqueous phase containing technetium free of ruthenium, palladium and rhodium. The technetium is recovered as a salt by mixing ammoniacal solution with the aqueous phase and crystallizing out ammonium pertechnetate at 0°C.

EXAMPLE II 100 ml of the simulated acidic waste solution of fission products (PAW) described in Example 1 is filtered through a 0.8 micron Millipore filter to remove undissolved rhodium solids. The filtrate is partially neutralized with 50 percent sodium hydroxide so that the resulting solution is approximately 0.2 molar in nitric acid. The partially neutralized filtrate is electrolyzed in a 150 ml. glass beaker cell similar to that of Example I at a controlled cathode potential of −0.40 volts with reference to a silver/silver chloride reference electrode for 48 hours in the manner described in Example I. The initial current density on the cathode is 70 milliamps/cm$^2$, which drops to 0.3 milliamps/cm$^2$ at the end of the electrolysis. Deposition of palladium, rhodium and technetium onto the cathode from the simulated solution is 99 percent. Ruthenium deposition is 60 percent. The spent electrolyte is disgarded and the cathode washed with 10 ml of deionized water. The metal deposit on the cathode is anodically stripped with 30 ml of 5 molar nitric acid. The palladium, rhodium and technetium deposits are dissolved in the nitric acid stripping solution and the solid rhodium is separated from this solution by filtration. The rhodium recovered by filtering the simulated acidic waste solution of fission products is combined with the solid rhodium separated by filtration of the anodically stripped metal deposits and the rhodium metal mixture purified in the manner described in Example I, i.e., potassium bisulfate dissolution followed by electrolytic recovery.

The filtrate obtained from filtering the nitric acid solution of anodically stripped metals (30 ml) contains 0.99 grams of palladium, 0.49 grams of technetium and 0.9 grams of ruthenium. To this solution, 50 percent sodium hydroxide is added until the resulting solution is about 3.2 molar in sodium nitrate and about 2 molar in sodium hydroxide. The final solution volume is 50 ml. To this 50 ml alkaline nitrate solution, 12.5 ml of 2,4-dimethylpyridine is added and the mixture placed in a 125 ml separatory funnel where it is shaken vigorously for about 5 minutes. The contents of the separatory funnel are allowed to stand for about 15 minutes to permit the resulting aqueous and organic phases to separate. The organic phase (12.3 ml) is withdrawn from the separatory funnel and 27 ml of deionized water added thereto. This mixture is transferred to a 50 ml 3-necked distillation flask equipped with a Friedrich condenser. The boiling point of the mixture is 97°–98°C and 33.9 ml of distillate are collected. The organic phase of the distillate (12.3 ml) is separated from the aqueous phase and 30 ml of deionized water added to it. The mixture is steam distilled and 2,4-dimethylpyridine is recovered for reuse.

The aqueous contents of the distillation flask (18 ml) contains 0.45 grams of technetium and 0.45 grams of palladium. Any ruthenium contamination in the distillation glass is below the level of detection. The aqueous solution is acidified with sulfuric acid to provide a solution that is 0.25 molar in sulfuric acid. This resulting acid solution (50 ml) is electrolyzed in a 100 ml beaker cell constructed similarly to that of the beaker cell described in Example I at a controlled cathode potential of +0.05 volts with reference to a silver/silver chloride reference electrode. The initial current density on the cathode is 10 milliamps/cm$^2$. The current density drops to less than 0.3 milliamps/cm$^2$ after 30 hours of electrolysis. The palladium depleted electrolyte is removed from the cell and the cathode washed with 10 ml of deionized water. The palladium deposit on the cathode is mechanically removed and 0.446 grams of palladium are recovered, which represents a 99+ percent recovery of the palladium charged to the cell.

The palladium depleted electrolyte is saturated with ammonia and technetium is precipitated as ammonium pertechnetate at 0°C. The mother liquor is discarded.

EXAMPLE III

The procedure of Example II is repeated except that the aqueous solution (18 ml) of technetium and palladium obtained from steam distilling the organic phase from the extraction step, is diluted to 25 ml with deionized water. The solution is saturated with ammonia and ammonium pertechnetate precipitated therefrom at 0°C. The ammonium pertechnetate precipitate is recovered by filtration. The filtrate, which contains 0.45 grams of palladium is acidified with concentrated hydrochloric acid (16 molar) to precipitate palladium as the complex salt, Pd(NH$_3$)$_2$Cl$_2$, which is recovered by filtration.

EXAMPLE IV

The procedure of Example I is repeated up to and including the recovery of technetium, ruthenium and palladium as a nitric acid solution of anodically stripped metals from the initial electrolysis step and the recovery and purification of rhodium. To the filtrate (30 ml) obtained from the rhodium separation step, which is 5 molar in nitric acid, there is added 50 percent sodium hydroxide until the solution is 0.25 molar in nitric acid. The final volume of the partially neutralized solution is 50 ml and contains 0.99 grams of palladium, 0.49 grams of technetium and 0.90 grams of ruthenium. This solution is charged to a 100 ml beaker cell constructed similarly to the cell described in Example I and the solution electrolyzed for 20 hours at a constant cathode potential of +0.05 volts with reference to a silver/silver chloride reference electrode. On completion of the electrolysis, 99.5 percent of the palladium in the solution along with trace amounts of ruthenium are deposited on the cathode.

The depleted electrolyte is removed from the cell and saved. The palladium deposit is purified by dissolving it in 0.25 molar nitric acid and replating the palladium on the cathode of the electrolytic cell in the manner previously described. The purification step is repeated a second time and the amount of ruthenium in the palladium measured. The ruthenium contamination is found to be about 2 microcuries of ruthenium per gram of palladium.

The palladium depleted electrolyte liquor is made alkaline with 50 percent sodium hydroxide until it is 2 molar in sodium hydroxide. The final volume of the alkaline solution is 60 ml. To this alkaline solution, there is added 15 ml of 2,4-dimethylpyridine. The mixture is shaken vigorously and the resulting aqueous and organic phases permitted to separate. The organic phase is steam distilled as described in Example II and the resulting aqueous phase saturated with ammonia. Technetium is precipitated from the aqueous solution as ammonium pertechnetate at 0°C. The remaining mother liquor is discarded.

We claim:

1. A process for separating rhodium, palladium and technetium from aqueous, acidic solutions containing said metal values and other fission product metal values said solution resulting from processing irradiated nuclear fuel, which comprises electrolyzing said solution having an acid concentration no greater than about 1 molar in an electrolytic cell under controlled cathodic potential conditions and at a potential at which rhodium, palladium and technetium are deposited on the cathode of the cell, removing metal depleted waste solution from the cell, dissolving metal deposited on the cathode in strong acid to provide an acid solution of deposited metal values, and separating undissolved rhodium metal from the solution.

2. The process of claim 1 wherein the acid waste solution is a Purex acid waste stream.

3. The process of claim 1 wherein the waste solution is filtered before electrolysis to remove undissolved rhodium therefrom.

4. The process of claim 1 wherein the waste solution is electrolyzed at a potential of at least −0.1 volts with reference to a standard silver/silver chloride reference electrode.

5. The process of claim 1 wherein the acid concentration of the waste solution electrolyzed is from about 0.25 molar to about 1 molar.

6. The process of claim 1 wherein undissolved rhodium metal is dissolved by fusion with alkali metal bisulfate selected from the group consisting of sodium and potassium bisulfate, and an aqueous solution of the fused product is electrolyzed in an electrolytic cell under controlled cathodic potential conditions and at a potential at which rhodium is deposited on the cathode.

7. The process of claim 6 wherein the aqueous solution is electrolyzed at a potential of from about −0.05 to about −0.5 volts with reference to a standard silver/silver chloride reference electrode.

8. The process of claim 1 wherein a strong oxidizing agent is added to the acid solution of deposited metal values in amounts sufficient to oxidize technetium and ruthenium present in said acid solution to their respective volatile oxides, the resulting solution is distilled to provide a technetium containing distillate and a palladium containing bottoms, and the distillate is electrolyzed in an electrolytic cell under controlled cathodic potential conditions and at a potential at which technetium metal is deposited on the cathode.

9. The process of claim 8 wherein the palladium containing bottoms is electrolyzed in an electrolytic cell under controlled cathodic potential conditions and at a potential at which palladium is deposited on the cathode and palladium metal is recovered from the cathode.

10. The process of claim 8 wherein technetium metal deposited on the cathode is dissolved in strong mineral acid to form an acid solution of technetium values, the acid solution is made alkaline with an alkaline reagent, technetium values are extracted from the alkaline solution with an organic solvent having affinity for technetium and technetium values are separated from the organic solvent.

11. The process of claim 10 wherein the organic solvent is pyridine or dimethyl substituted pyridine derivatives.

12. The process of claim 10 wherein the organic solvent is steam distilled to provide an aqueous solution containing technetium values and ammoniacal reagent is added to the aqueous solution in amounts sufficient to form ammonium pertechnetate.

13. The process of claim 1 wherein the acid solution of deposited metal values is made alkaline with alkaline reagent and the resuting alkaline aqueous solution is contacted intimately with organic solvent having affinity for technetium to form an organic phase containing technetium values and an aqueous phase.

14. The process of claim 13 wherein the organic phase is steam distilled to produce an aqueous solution containing technetium values and an ammoniacal reagent is added to the aqueous solution in amounts sufficient to form ammonium pertechnetate.

15. The process of claim 14 wherein ammonium pertechnetate is crystallized from the aqueous solution and hydrogen chloride added to the mother liquor in amounts sufficient to precipitate palladium values contained therein as the salt, dichlorodiamminepalladium-(II)

16. The process of claim 13 wherein the organic phase is steam distilled to produce an aqueous solution containing technetium and palladium values, mineral acid is added to the aqueous solution in amounts sufficient to provide an acidic aqueous solution having an acid concentration of not greater than about 1 molar, and the acidic aqueous solution is electrolyzed in an electrolytic cell under controlled cathodic potential conditions and at a potential sufficiently negative to deposit palladium on the cathode but sufficiently positive with respect to the potential at which technetium is deposited to thereby retain technetium in solution.

17. The process of claim 16 wherein the palladium depleted aqueous solution is treated with ammoniacal reagent in amounts sufficient to form ammonium pertechnetate and ammonium pertechnetate crystallized from the solution.

18. The process of claim 1 wherein the acid solution of deposited metal values is electrolyzed in an electrolytic cell under controlled cathodic potential conditions and at a potential sufficiently negative to deposit palladium on the cathode but sufficiently positive with respect to the potential at which technetium is deposited to thereby retain technetium in solution.

19. The process of claim 18 wherein the acid solution electrolyzed has an acid concentration not greater than about 1 molar.

20. The process of claim 18 wherein the palladium depleted solution is made alkaline with alkaline reagent, the alkaline solution intimately contacted with organic solvent having affinity for technetium to form an organic phase containing technetium and an aqueous phase, the organic phase is steam distilled to produce an aqueous solution containing technetium values and the aqueous solution is treated with ammoniacal reagent in amounts sufficient to form ammonium pertechnetate.

21. A process for separating rhodium values from aqueous acidic solutions containing said metal values and other fission product metal values, said solution resulting from processing irradiated nuclear fuel, which comprises electrolyzing said solution having an acid concentration no greater than about 4 molar in an electrolytic cell under controlled cathodic potential conditions and at a potential of from about −0.05 to about −0.5 volts with reference to a standard silver/silver chloride reference electrode, removing metal depleted waste solution from the cell, dissolving acid soluble metal deposited on the cathode in strong acid and separating undissolved rhodium metal from the resulting acid solution.

22. A process for separating palladium values from aqueous acidic solutions containing said metal values and other fission product metal values, said solution resulting from processing irradiated nuclear fuel, which comprises electrolyzing said solution having an acid concentration no greater than about 4 molar in an electrolytic cell under controlled cathodic potential conditions and at a potential of from about +0.1 to about −0.05 volts with reference to a standard silver/silver chloride reference electrode, removing metal depleted waste solution from the cell and removing palladium deposits from the cathode.

23. A process for separating technetium values from aqueous, acidic solutions containing said metal values and other fission product metal values, said solution resulting from processing irradiated nuclear fuel, which comprises electrolyzing said solution having an acid concentration no greater than about 1 molar in an electrolytic cell under controlled cathodic potential conditions and at a potential of from about −0.3 to about −0.5 volts with reference to a standard silver/silver chloride reference electrode, removing metal depleted waste solution from the cell and removing technetium deposits from the cathode.

* * * * *